Nov. 2, 1954 V. M. STEWART 2,693,208
POWER-OPERATED ROUTING TOOL
Filed May 11, 1951
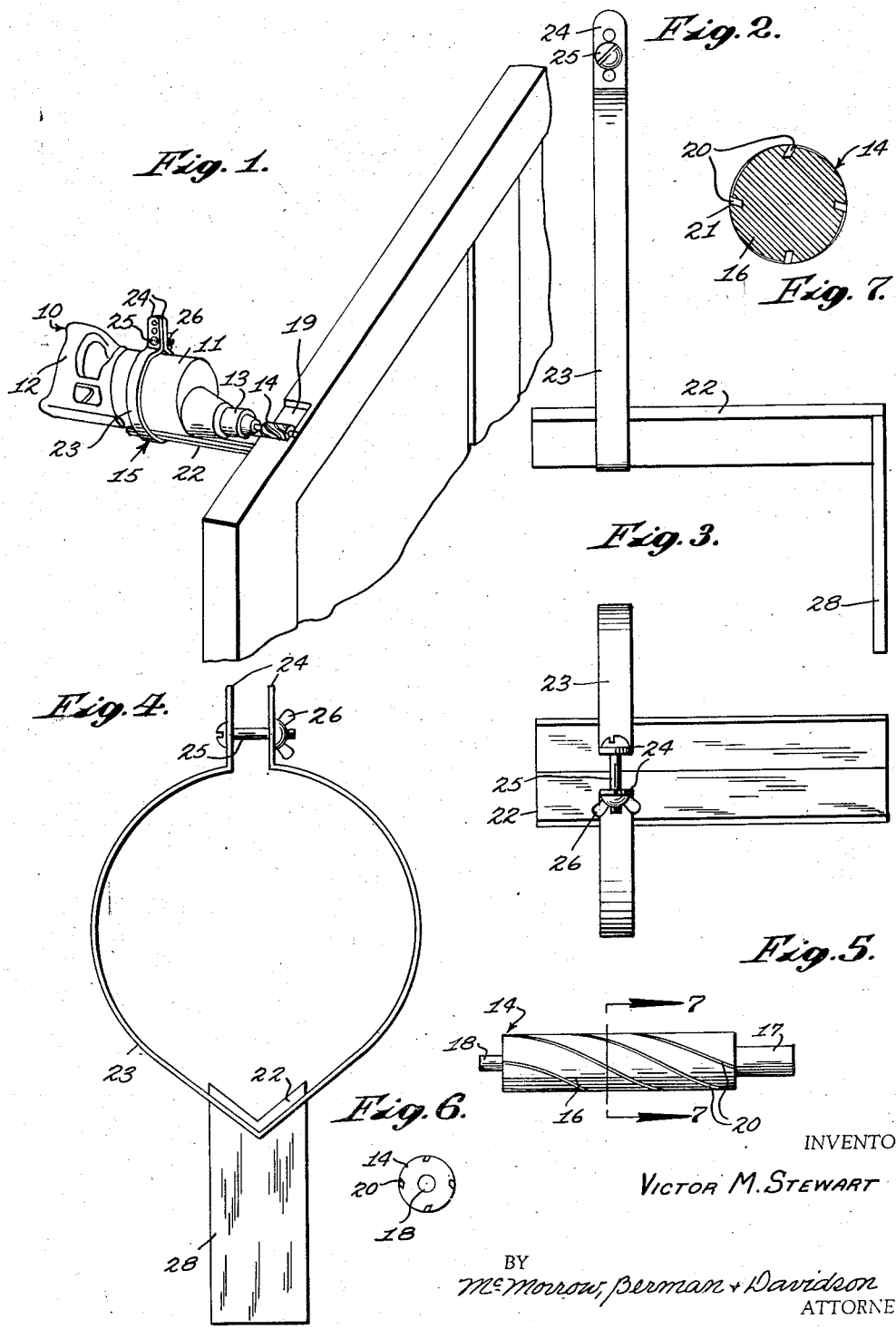
INVENTOR
VICTOR M. STEWART
BY
McMorrow, Berman + Davidson
ATTORNEYS

United States Patent Office 2,693,208
Patented Nov. 2, 1954

2,693,208

POWER-OPERATED ROUTING TOOL

Victor M. Stewart, Kansas City, Kans.

Application May 11, 1951, Serial No. 225,823

1 Claim. (Cl. 144—27)

This invention relates to power hand tools and more particularly to a hand tool for routing out recesses in work pieces, such as hinge receiving recesses in doors.

It is among the objects of the invention to provide an improved power operated hand router which utilizes an electric hand drill of known construction and provides a routing bit particularly adapted to routing out hinge receiving recesses in doors and door frames; which provides recesses of a predetermined depth and selected width corresponding to the thickness and width of the hinge butts to be received therein; which includes a gauge assembly used to hold the router bit in engagement with the work and which also serves as a width gauge for the router; and which is simple and durable in construction, economical to manufacture and easy to operate.

Other objects and advantages will become apparent from a consideration of the following description and the appended claims in conjunction with the accompanying drawing wherein:

Figure 1 is a perspective view showing a power operated hand router illustrative of the invention in operative engagement with the edge of a door;

Figure 2 is a side elevational view of a gauge assembly for the router;

Figure 3 is a top plan view of the assembly shown in Figure 2;

Figure 4 is an end elevational view of the assembly;

Figure 5 is a side elevational view of a router bit;

Figure 6 is an end elevational view looking at the left-hand end of the bit as illustrated in Figure 5; and Figure 7 is a transverse cross sectional view of the bit on the line 7—7 of Figure 5.

With continued reference to the drawing, the power operated hand router comprises an electric drill, generally indicated at 10, of known construction having a substantially cylindrical motor housing 11, a hand grip 12 at one end of the motor housing and a chuck 13 at the other end of the housing.

A routing bit 14 is secured at one end in the chuck 13 and a gauge assembly, generally indicated at 15, is secured to the housing 11 and includes a lateral work engaging arm 28 extending away from the bit 14 substantially perpendicular to the bit.

The bit 14 comprises a cylindrical body of suitable material, such as carbon tool steel, having an intermediate portion 16 and a shank portion 17 and a gauge pin 18 of reduced diameter extending one from each end of the intermediate portion substantially coaxially thereof. The shank portion 17 has a diametrical dimension which properly fits the chuck 13 of the electric drill, a diameter of one quarter inch being appropriate for a quarter inch drill, this being the size of drill preferred for the device of the invention. The gauge pin 18 is of smaller diameter than the end member 17 and is provided to rest upon the surface of the work piece at one side of the recess 19 routed into the work piece by the bit, as illustrated in Figure 1, to provide a depth gauge determining the depth of the recess provided by the routing bit 14.

The intermediate portion 16 of the bit is formed with spaced apart spiral grooves 20 providing cutting edges as indicated at 21 in Figure 7, for removing material from the work piece.

The depth of the spiral grooves is disposed at an angle to corresponding radii of the bit, so that the cutting edges have a set or rake which causes them to bite into the material of a work piece when the bit is rotated in the proper direction and the grooves have a depth materially greater than the height of the cutting edges or blades to provide clearance for cuttings removed from the work piece by the bit.

The gauge assembly 15 comprises an angle iron bar 22 having its open side disposed against the cylindrical motor housing 11 of the drill and extending from the motor housing past the chuck 13 of the drill substantially parallel to the axis of rotation of the bit 14. A clamp band 23 is secured, intermediate its length, to the bar 22 near one end of the bar and encircles the motor housing 11. This clamp band has its ends bent outwardly and apertured to provide apertured lugs 24 which are spaced apart and mutually opposed, and a screw 25 extends through the lugs 24 and carries a wing nut 26 for tightly clamping the band about the motor housing and securing the bar 22 to the electric drill. The abutment arm 28 is preferably of elongated, rectangular cross sectional shape and is secured at one end to the bar 22 at the end of the bar remote from the clamp band 23 and extends from the corresponding end of the bar 22 substantially perpendicular to the rotational axis of the bit 14 for engagement with the adjacent side of the work piece. Hand pressure on the arm 28 supports the bit 14 in operative engagement with the work piece and also determines the width of the recess 19 routed out by the bit. The width of the recess can be changed by adjustably moving the clamp band 23 longitudinally of the motor housing 11 and clamping the band in place on the motor housing at the selected position.

The hand router, when properly adjusted, can be used to quickly rout out the hinge butt receiving recesses in doors and door frames, saving the greater part of the time usually required to form these recesses with chisels or routing planes.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

In a router, a motor housing, a chuck projecting from one end of the housing, a side cutting router bit secured in and extending axially outwardly from said chuck, a single bar secured along a side of said motor housing and having a longitudinally outward end located longitudinally outwardly beyond said chuck, and a single lateral arm fixed on the longitudinally outward end of said bar and extending at an angle to the axis of the router bit for slidably engaging the work for limiting the width of a cut made by the router bit in the work with respect to one surface of the work, said bit having a reduced work-engaging pin on its axially outward end to roll upon another surface of the work disposed at an angle to the first-mentioned work surface for limiting the depth of the cut made by the router bit with respect to said other surface of the work.

References Cited in the file of this patent

UNITED STATES PATENTS

| Number | Name | Date |
|---|---|---|
| 846,666 | Hanson | Mar. 3, 1907 |
| 1,425,893 | Olson | Aug. 15, 1922 |
| 1,433,497 | Carter | Oct. 24, 1922 |
| 1,446,342 | Gerdil | Feb. 20, 1923 |
| 1,461,376 | Bartlet | July 10, 1923 |
| 1,527,785 | Carter | Feb. 24, 1925 |
| 1,566,373 | Carter | Dec. 22, 1925 |
| 1,611,381 | Salsbury | Dec. 21, 1926 |
| 2,238,304 | Belanger | Apr. 15, 1941 |
| 2,348,406 | Ogren | May 9, 1944 |
| 2,364,688 | Bovee | Dec. 12, 1944 |
| 2,448,361 | Dudruck | Aug. 31, 1948 |

FOREIGN PATENTS

| Number | Country | Date |
|---|---|---|
| 603,858 | France | Jan. 14, 1926 |
| 516,584 | Germany | Jan. 24, 1931 |